United States Patent [19]

Crocker et al.

[11] 4,010,549
[45] Mar. 8, 1977

[54] ALL SOLID STATE ANALOG GYROMAGNETIC COMPASS SYSTEM

[75] Inventors: David R. Crocker; George W. Snyder, both of Phoenix, Ariz.

[73] Assignee: Sperry Rand Corporation, New York, N.Y.

[22] Filed: Oct. 29, 1975

[21] Appl. No.: 626,898

[52] U.S. Cl. .............................................. 33/317 D
[51] Int. Cl.$^2$ ...................................... G01C 17/38
[58] Field of Search ................ 33/316, 317, 317 D, 33/318

[56] References Cited

UNITED STATES PATENTS

| | | | |
|---|---|---|---|
| 3,831,286 | 8/1974 | Conibear | 33/317 D |
| 3,837,086 | 9/1974 | James | 33/317 D |
| 3,844,051 | 10/1974 | Wiklund | 33/317 D |
| 3,911,255 | 10/1975 | Dewar et al. | 33/318 |

Primary Examiner—William D. Martin, Jr.
Attorney, Agent, or Firm—Howard P. Terry

[57] ABSTRACT

An all solid state gyromagnetic compass system operable in the slaved, compass and free gyro modes wherein magnetic compass error rates, fast or slow slaving rates, gyro drift rates, earth's rate and set heading rates are all produced by means of a solid state analog angle rate generator. This generator includes a dual slope integrator responsive to scaled d.c. voltages representing the required rates and which generate shaped sine and cosine control signals therefrom for the various system modes having constant amplitudes and variable frequency representing the required rates. The system outputs are provided in standard three wire synchro format for interfacing with any utilization system requiring conventional slaved gyromagnetic compass data, magnetic compass data or free gyro data.

12 Claims, 6 Drawing Figures

FIG. 1.

| MODE | | SWITCH POSITION | | |
|---|---|---|---|---|
| | | SW.1 | SW.2 | SW.3 |
| SLAVE | | A | A | X |
| COMPASS | | B | A | X |
| DG | GYRO | A | B | A |
| | SET HDG. | A | B | B |

FIG.2.

| | | SWITCH POSITION | | |
|---|---|---|---|---|
| SIN | COS | S1 | S2 | S3 |
| POS | POS | B | B | B |
| POS | NEG | A | A | A |
| NEG | NEG | A | B | A |
| NEG | POS | B | A | B |

ALL SOLID STATE ANALOG GYROMAGNETIC COMPASS SYSTEM

BACKGROUND OF THE INVENTION

1. Field of the Invention

The present invention relates generally to gyromagnetic compass systems for navigable craft and more specifically to an analog, all solid state gyromagnetic compass system.

2. Description of the Prior Art

Systems in which the output of a gyroscope is slaved to the output of a flux valve have been known to the art for many years and have indeed become the standard heading reference for modern commerical and military aircraft. The basic form of such a system is shown in U.S. Pat. Nos. 2,357,319; 2,383,416; and 2,969,208, all assigned to the assignee of the present invention. In these patents, the directional reference provided by the gyroscope is electromechanically slaved to the direction of the earth's magnetic field as detected by a flux valve, by comparing the direction of the earth's field with the gyro reference direction and applying the difference therebetween to a torquer on the gyro thereby causing the gyro to precess such that the error reduces to zero and the gyro reference corresponds to magnetic north.

The flux valve senses the horizontal component of the earth's magnetic field by maintaining the sensing elements of the valve in a generally horizontal plane through a pendulous mounting thereof in the aircraft. Therefore, if the craft is subjected to acceleration forces, the flux valve information may be in error as a result of its coupling with the vertical component of the magnetic field. However, in straight and level unaccelerated flight, the flux valve provides stable directional information. On the other hand, the gyroscope provides stable information during turns and short term accelerations of the craft but is subject to a long term drift usually inherent in gyroscopic devices. Since in a conventional gyromagnetic compass system the flux valve-gyro error is applied to a torquer on the gyro to precess the same at a relatively slow rate, i.e., about two degrees or three degrees per minute, the gyro serving to integrate the flux valve information to thereby remove the undesired short term errors. However, short term maneuvers of the craft will immediately be detected by the gyro but will not be seen by the slaving loop. Long term gyro drift on the other hand will not be allowed to build up on long term basis because the gyro is slaved to the flux valve.

Many variations of the basic gyromagnetic compass configuration just described have been proposed and successfully implemented. One of these is an arrangement wherein the gyro spin or reference axis is not slaved to the magnetic meridian and the integration of the flux valve information is accomplished by an electromechanical integrator, the gyro information providing only the short term data stabilization supplied through a fast response electromechanical follow-up loop. Such a system is described in Applicant's assignee's U.S. Pat. No. 2,699,612.

Further improvements in the latter type of configuration are illustrated in Applicant's assignee's U.S. Pat. No. 3,691,643 wherein long term data from the flux valve and short term gyro data are combined, for example, at a differential synchro on the gyro, to produce an error signal or synchronizing angle signal for electronically "slaving" the gyro. The error is applied to the differential signal in such a manner as to reduce the error on a long term basis while permitting short term gyro data to be directly transmitted to the system output. This system is an all solid state system but employs digital computation technique which while accurate and reliable are relatively expensive in terms of hardware and software mechanization.

SUMMARY OF THE INVENTION

The gyromagnetic compass system of the present invention is an all solid state analog electronic system of the general type disclosed in the above-mentioned U.S. Pat. No. 3,691,643 but embodying all analog techniques which achieves the accuracy and reliability advantages thereof but avoids the usually very high expense attendant purely digital systems.

In general, gyromagnetic compass systems of the type under consideration involve the generation and manipulation of angular displacement and angular rate data, which in prior art analog systems, were generated and manipulated by electromechanical servo loops involving angular signal generators and receivers of the well known synchro type. In the prior art digital systems, this data is generated and manipulated by employing relatively complex and expensive analog-to-digital and digital-to-analog converters, digital control transformers, up-down counters, memories, multiplexers and program controls.

In the present invention, however, the angular displacement and angular rate data are generated by means of a solid state angle rate generator controlled from direct current control signals, thereby eliminating the expensive digital apparatus and the mechanical and electromechanical devices with the exception of a simple a.c. resolver or differential. The generator output is used for the purpose of enabling, in the slaved gyro mode, a d.c. flux valve signal to be compared with the gyro angular signal measured by means of the a.c. resolver. Also, depending upon the mode of operation of the system, other angle rate information is necessary; for example, flux valve data alone in the compass mode and earth's rate and gyro drift rate data in the gyro or d.g. mode. These latter angular rate signals are determined by suitably scaled values of d.c. signals representative thereof.

Generally, the angle rate generator comprises a dual slope integrator controlled from d.c. signals scaled to produce the desired output angular rate and suitable gradient switching controlled from an amplitude reference source and cross-over detectors to provide sine and cosine triangular waves. These triangular waves are thereafter suitably shaped to provide sinusoidal waveforms of the desired resolution for transmission to user systems.

DESCRIPTION OF THE PREFERRED EMBODIMENT

Figure 1:
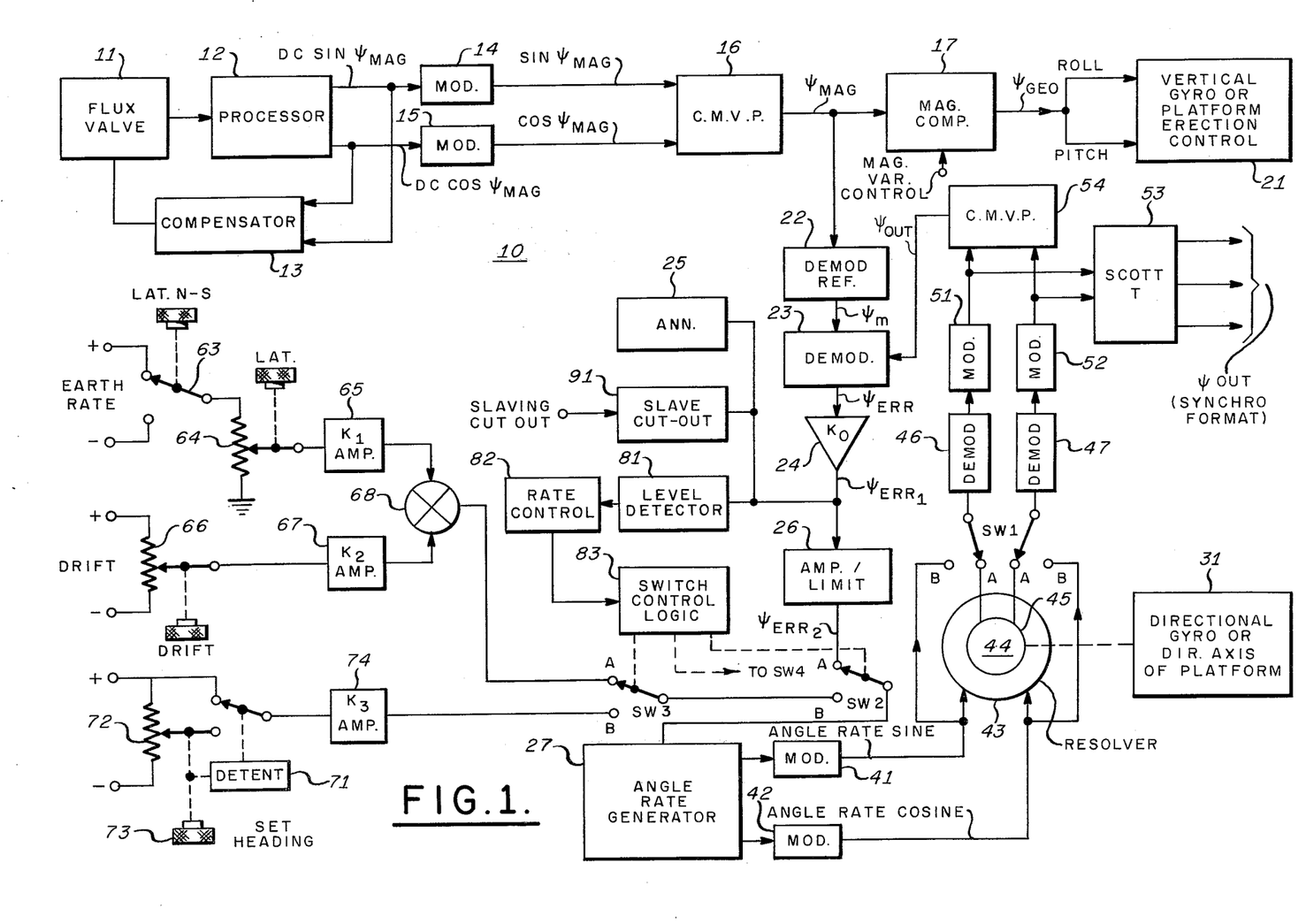
FIG. 1 is a schematic block diagram illustrating the all solid state analog gyromagnetic compass system of the present invention.

Referring now to FIG. 1, the solid state analog gyromagnetic compass system 10 of the present invention is schematically illustrated. A flux valve 11, similar to that described in U.S. Pat. No. 3,573,610 entitled "Earth's Field-Sensitive Magnetometer for use in Compass Systems . . . " in the name of Donald J. Kesselring and assigned to the assignee of the present invention, responsive to the earth's magnetic field and having a plurality of pick-up windings produces electrical signals representative of the direction of the earth's magnetic field vector and from which the magnetic heading of the craft may be determined. These electrical signals are coupled to a processor 12, similar to that described in U.S. Pat. No. 3,678,593 entitled "Compass System and Components Therefor Having Automatic Field Cancellation" in the names of Donald H. Baker and Frank H. Kallio, and assigned to the assignee of the present invention. In the processor 12, the earth's field vector as represented by electrical signals from the flux valve 11 is resolved into component values that are converted into proportional d.c. currents, DC sin $\psi_{mag}$ and DC cos $\psi_{mag}$.

The d.c. component signals are coupled from the processor 12 to a compensator 13 which comprises the apparatus described in U.S. Pat. Nos. 3,938,257 issued Feb. 17, 1976; 3,942,257 issued Mar. 19, 1976; and 3,939,572 issued Feb. 24, 1976; entitled respectively "Two-Cycle Compensator for Flux Valve Heading Repeater System", "Index Error Correction for Flux Valve Heading Repeater System" and "Latitude Compensator for Flux Valve Heading Repeater System", all in the name of James R. Erspamer, and all assigned in the name of the assignee of the present invention. The compensator 13 compensates the d.c. sin and cos components with respect to index error, single cycle North/South-East/West (latitude) error and two-cycle cardinal and two-cycle intercardinal errors and adjusts the output of the flux valve 11 through d.c. feedbacks thereto until the aforementioned errors are substantially cancelled. DC sin $\psi_{mag}$ and DC cos $\psi_{mag}$ are also coupled to modulator circuits 14 and 15, respectively, wherein the d.c. signals are converted to sinusoidal signals as represented by sin $\psi_{mag}$ and cos $\psi_{mag}$, respectively.

The sine and cosine components of $\psi_{mag}$ are thereafter coupled to a CMVP circuit 16, similar to that described in U.S. Pat. No. 3,617,863 entitled "Constant Amplitude-Variable Phase Circuit" in the name of David A. Espen and assigned to the assignee of the present invention. The CMVP circuit 16 converts the sine and cosine components of $\psi_{mag}$ to a signal $\psi_{mag}$ having constant magnitude and variable phase and wherein the phase is proportional to the magnetic heading of the craft. $\psi_{mag}$ is coupled to a magnetic compensation circuit 17 wherein $\psi_{mag}$ is modified, that is, phase shifted by zero degrees, +15 degrees, or −15 degrees depending on the geographical location (latitude) of the craft and in response to a magnetic variable control signal. The output $\psi_{geo}$ therefrom may be employed in a second order erection control system 21 of, for example, a vertical gyro or platform. $\psi_{mag}$ is also coupled to a demodulator reference circuit 22 wherein it is modified from a sinusoidal wave to a square wave $\psi_m$. Utilization of a square wave as opposed to a sinusoidal wave increases the demodulation accuracy and simplifies the complexity of the demodulator reference circuit 22.

The square wave output $\psi_m$ of demodulator reference circuit 22 is coupled to demodulator circuit 23 along with a square wave signal $\psi_{out}$. $\psi_{out}$ includes the combination of the output from the directional gyro 31 and the error signal developed by the gyromagnetic compass system as will be more fully described hereinafter. $\psi_m$ and $\psi_{out}$ are both square wave signals typically having a 400 Hz carrier frequency. The demodulator circuit 23 compares $\psi_m$ and $\psi_{out}$ and produces a d.c. error signal $\psi_{err}$ therefrom proportional to the phase difference therebetween. $\psi_{err}$ is coupled to a $K_o$ amplifier 24 where it is appropriately amplified and thereafter coupled to a cockpit mounted annunciator 25 to indicate to the pilot that the system is slaving. The output $\psi_{err}$ of amplifier 24 is also coupled to a high gain precision voltage amplifier/limiter circuit 26. The amplifier/limiter essentially limits the amplitude of $\psi_{err}$ to a ceiling value, typically with an amplitude which will produce a slaving rate on the order of between 2.5 and 3° per minute.

The output $\psi_{err}$ of the amplifier/limiter circuit 26 is coupled to an angle rate generator circuit 27. The angle rate generator 27 (the operation of which will be detailed more fully hereinafter) produces sine and cosine components of an angle rate signal, i.e., generally sinusoidal wave shapes, having constant magnitudes and variable frequencies which change as a function of the magnitude and polarity of the d.c. error signal applied to its input. The angle rate sine and the angle rate cosine signals are applied to modulator circuits 41 and 42, respectively, where they are utilized to modulate square wave signals, typically 400 Hz infrequency, generated thereby. Square wave modulators are again utilized to avoid using more expensive sinusoidal wave modulators. The outputs from modulators 41 and 42 are applied to the stator windings 43 of resolver or differential 44, providing excitation signals for the resolver 44 in addition to the slaving error signal $\psi_{err}$.

The resolver 44, which may be any suitable electrical differential device, such as a synchro resolver, has its rotor connected with the directional gyro output shaft and therefore detects the inertial heading of the craft as developed by the directional gyro. The directional gyroscope 31 may be a stand along gyroscope, or a gyroscopic platform such as that described in U.S. Pat. No. 3,648,525 entitled "Gyroscopic Stable Reference Apparatus" in the names of Charles B. Reed and assigned to the assignee of the present invention. In the present invention, the stator windings of the resolver 44 is fixed relative to the directional gyro 31 while the rotor windings is positioned thereby. The resolver therefore acts as a summing device to sum the angular signals developed by the angle rate generator with those developed by the gyroscope 31. Accordingly, the outputs from the rotor windings 45 of resolver 44 may be represented as sin ($\psi_{platform}$ + $\psi_{err}$) and cos ($\psi_{platform}$ + $\psi_{err}$), respectively, where $\psi_{platform}$ represents the inertial heading of the craft as developed by the directional gyro. The outputs from the rotor windings 45 are demodulated by demodulator circuits 46 and 47, respectively. This demodulation is performed in order to remove undesired harmonics from the rotor output signals. The outputs from demodulator circuits 46 and 47 are thereafter re-modulated by modulator circuits 51 and 52, respectively. The outputs from modulator circuits 51 and 52 are coupled to a Scott T transformer 53 from which system output data in synchro format is derived to be supplied to any system utilizing or requiring heading information such as panel instruments, an autopilot and/or a flight director. The outputs from modulator circuits 51 and 52 are also coupled to a CMVP circuit 54 similar to CMVP circuit 16. CMVP circuit 54 converts the sine and cosine component signals from modulators 51 and 52 into a constant magnitude variable phase output signal $\psi_{out}$ which is thereafter coupled to demodulator circuit 23 for comparison with the $\psi_m$ signal.

The foregoing description of the gyromagnetic compass system 10 depicts the operation of the system in the slaving mode. In this mode, the inertial heading of the craft as developed by the directional gyro 31 is electronically slaved to the magnetic heading of the craft as developed by the flux valve 11. As earlier noted in the Description of the Prior Art, the flux valve senses the horizontal component of the earth's magnetic field by maintaining its sensing elements in a generally horizontal plane through a pendulous mounting thereof in the aircraft. While providing an excellent long term heading reference, the flux valve is subject to short term perturbations due to aircraft accelerations acting on the pendulous element thereof. Additionally, the directional gyroscope stabilized by the gyroscopic inertia of a spinning rotor, provides a stable short term heading reference but is subject to long term perturbations due to imperfections in the gyroscope which cause it to drift away from its reference direction. Typically, these drift characteristics, are very small, for example, on the order of a fraction of a degree per hour, depending on the quality of the gyroscope.

It can therefore be appreciated that the magnetic heading $\psi_{mag}$ has both a desired long term component and an undesired short term component while the inertial heading $\psi_{platform}$ has a desired short term component and an undesired long term component. The present invention, using all analog solid state apparatus electronically slaves the directional gyro to the magnetic heading from the craft thereby providing an output signal which is comprised of the desirable short term components of the inertial heading and the desirable long term component of the magnetic heading.

Accordingly, the magnetic heading $\psi_m$ (in square wave, constant magnitude-variable phase format) is compared with the output heading $\psi_{out}$ (in square wave constant magnitude-variable phase format) by demodulator circuit 23 and the phase difference therebetween represented by $\psi_{err}$ is coupled to the angle rate generator 27. The angle rate generator, utilizing a dual slope integrator and switching devices which will be more fully described hereinafter, develops an angle rate signal having orthogonal components (angle rate sine and angle rate cosine). Since the angle rate generator in the slave mode employs a long time-constant integrator, the short term components of the error signal $\psi_{err}$ are effectively removed from the angle rate signal. Therefore, the orthogonal components of the angle rate signal represent the difference between the long term component of the magnetic heading and the long term component of the output heading.

The orthogonal components (angle rate sine and angle rate cosine) of the angle rate signal are utilized to modulate excitation signals which are applied to the sine/cosine windings of resolver stator 43. Since the sine/cosine windings of the resolver rotor 45 are mounted on and positioned by the vertical gimbal trunnion of directional gyro 31, the output therefrom will include the long term difference between the magnetic and inertial heading of the craft and short term intertial heading information due to rapid change in craft heading detected by the gyro. Therefore, the output from the sine/cosine windings of the rotor 45, as earlier noted, may be represented by sin $(\psi_{platform} + \psi_{err})$ and cos $(\psi_{platform} + \psi_{err})$ where $(\psi_{platform} + \psi_{err})$ effectively equals the short term component inertial heading plus the long term component of the magnetic heading.

The output from the sine/cosine windings of resolver rotor 45 is coupled to a Scott T transformer where it is converted to synchro format for use by an autopilot, etc. and wherein the output contains the desired short term components of the inertial heading and the desirable long term component of the magnetic heading. The sine/cosine windings of the resolver rotor 45 are also coupled to a constant magnitude/variable phase circuit 54, the output of which is coupled to demodulator circuit 23 for comparison with the magnetic heading of the craft $\psi_m$.

It has been noted that the directional gyro is electronically slaved to the magnetic heading of the craft. The term electronically is utilized to distinguish between the mechanical or electromechanical slaving in most prior art systems. Specifically, prior art systems electromechanically slave the directional gyro such that the directional gyro was precessed until the error signal was reduced to zero. In the present invention, however, the directional gyro is not precessed and therefore the electromechanical torquer and the attendant undesirable features thereof are eliminated. Accordingly, when the d.c. error signal $\psi_{err}$ reaches zero, the directional gyro 31 may not be properly aligned with the desired heading the craft. Therefore, the system must continue to provide the long term difference component of the heading even after the d.c. error signal $\psi_{err}$ has been reduced to zero. This function is provided by the angle rate generator 27, as will be more fully described hereinafter.

The gyromagnetic compass system of the present invention is also capable of operating in the other conventional modes in addition to slaving mode including a compass mode, a DG or gyro mode and a set heading mode. Additionally, the system is capable of quickly slaving to the magnetic heading under certain circumstances to be enumerated hereinafter. This is referred to as the synchronization mode.

In the cockpit of the craft, the pilot is typically provided with a three position switch (not shown) which will enable him to choose between the slaving mode, the DG or gyro mode and the compass mode. Should the pilot select the compass mode, if, for example, the directional gyro 31 has failed, the switches SW1 in FIG. 1 will transfer from the A to the B positions. (Switches SW1, SW2 and SW3 are illustrated in FIG. 1 for the slaving mode). In this configuration, the angle rate sine and angle rate cosine as modulated by modulator circuits 41 and 42 are directly coupled to demodulator circuits 46 and 47, respectively, thereby bypassing the resolver 44. In the compass mode, as is apparent from the foregoing description, the output heading of the system is comprised solely of the long term component of the magnetic heading $\psi_m$ of the craft.

If the pilot selects the DG or gyro mode when, for example, the craft is operating in a location where the strength of the earth's magnetic field is inadequate for compass purposes, switch SW1 will remain in the A position while switch SW2 will switch from the A position to the B position. In this configuration, the directional gyro is supplying both the long and short term heading data of the output. since it is supplying long term heading data, certain known long term effects may be compensated for, more particularly, the earth's rate and a calibrated gyro drift rate. Accordingly, the earth's rate is provided by means of a latitude North-/South selector 63 which is operated to provide either plus or minus polarity voltage according to the hemisphere in which the craft is operating. A potentiometer 64 is thereafter adjusted according to the latitude at which the craft is located. An amplifier 65 coupled to the wiper of potentiometer 64 scales the output thereof to the appropriate proportion of a rate of 15 degrees per hour corresponding to the maximum earth's rate.

The drift rate is produced by coupling a potentiometer 66 to a potential source. The wiper of potentiometer 66 is thereafter adjusted to correspond to the calibrated drift rate of the particular directional gyro 31 being used in the system. An amplifier 67 coupled to the wiper of potentiometer 66 scales the output thereof to the appropriate proportion of 5 degrees per hour. The value of 5 degrees per hour is chosen since quality directional gyros are consistently manufactured with a drift rate which does not exceed this value.

The outputs of amplifiers 65 and 67 are coupled to a summing circuit 68 and the output therefrom is coupled through switches SW3 and SW2 to the angle rate generator 27, since these parameters (earth rate and drift) are angular rates. Accordingly, the inertial heading developed in the sine/cosine windings of resolver rotor 45 are modified by the earth's rate and the gyro drift rate developed by the angle rate generator and coupled to the sine/cosine windings of the resolver stator 43.

If the pilot desires to change the heading of the craft, he may initiate the set heading mode. While the particular system under discussion is implemented such that the heading mode may be initiated only with the three-position selector switch (not shown) is in the DG mode, it will be appreciated that the system may be implemented such that the set heading mode may be initiated in any of the slaved, compass or DG modes. In this configuration, the pilot may select a new heading by means of a cockpit controller 71 which he may rotate to adjust the present gyro heading to a new heading at a desired rate. Once again, this angular change involves an angular rate and therefore is provided by the angle rate generator 27. The cockpit controller 71 is typically comprised of a potentiometer 72 coupled to a d.c. source and adjustable by means of a set heading knob 73 to provide a plus or minus signal proportional to the amount the knob 73 is rotated. Preferably, the knob is of the push-to-set, spring-centered-to-zero type commonly utilized in many rate command controllers. In this configuration, the wiper of potentiometer 72 is coupled to an amplifier 74 where the output thereof is scaled to the appropriate proportional value of a maximum rotation rate, typically 1250° per minute.

In the set heading mode, the detent 71 may be arranged to also actuate switch SW3 in order to couple the output from amplifier 74 to the angle rate generator 27. The knob 73 of cockpit controller 71, when actuated or pressed in, operates the detent and also removes a predetermined fixed maximum signal from the d.c. source, used for automatic synchronization, and substitutes therefor the variable heading set signal. Thus, when a set heading knob is not operated subsequent to actuation of switch SW3, the predetermined fixed signal from the d.c. source is applied through amplifier 74 resulting in the maximum, i.e., 1250° per minute, synchronization rate.

Figure 2:
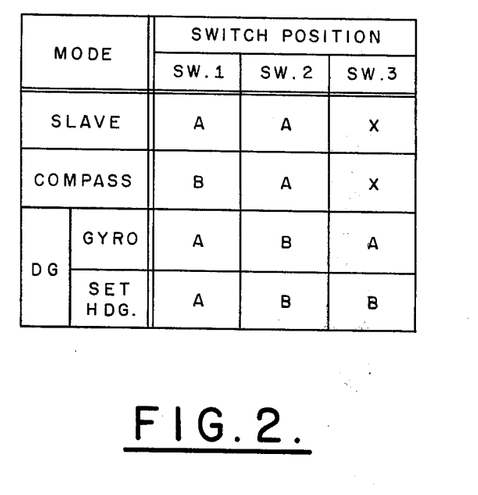
FIG. 2 is a table indicating the position of switches SW1, SW2 and SW3 with respect to the various modes of operation of the system.

Referring now to FIG. 2, the positions of switches SW1, SW2 and SW3 in the various modes of operation as heretofore explained are indicated. In FIG. 2, the marking X indicates that the position of the particular switch for the designated mode is immaterial.

As earlier noted, there are situations where it is desired to quickly slave or resynchronize the output heading to the magnetic heading; for example, after a long continuous turning of the craft when the flux valve has been cut off, after extreme maneuvers which might disturb the gyro reference or when power is initially applied to the system. In these situations, the level detector circuit 81 coupled to the output of amplifier 24 will monitor the d.c. error signals $\psi_{err}$. If the level of $\psi_{err}$ exceeds a predetermined value, the level detector 81 will actuate rate control circuit 82. The rate control circuit, in response to the output from the level detector circuit 81 actuates switch control logic circuitry 83. The switch control logic 83 actuates switches SW2 and SW3 to their B positions thereby initiating automatic fast resynchronization or fast slaving. In this configuration, assuming that cockpit controller 71 has not been actuated, the maximum rate, 1250° per minute, will be applied to the angle rate generator 27 thereby quickly slaving the output heading of the craft. When the d.c. error signal $\psi_{err}$ reduces to a level below the predetermined magnitude in level detector 81, the rate control circuit 82 returns to normal thereby reactuating switches SW2 and SW3 by means of switch control logic 83.

The system may also be provided with means to remove the slaving signal in situations where the magnetic heading data is known to be in error. Specifically, in situations where the aircraft is in a turn and in which the pendulously mounted flux valve hangs off due to turn acceleration and thereby gives erroneous magnetic heading information, a slaving cut-out signal may be provided from circuitry (not shown) to actuate slave cutout circuit 91. Slave cut-out circuit 91, in response thereto, will remove the d.c. error signal $\psi_{err}$ from the angle rate generator until the situation causing the erroneous information has terminated.

Figure 3:
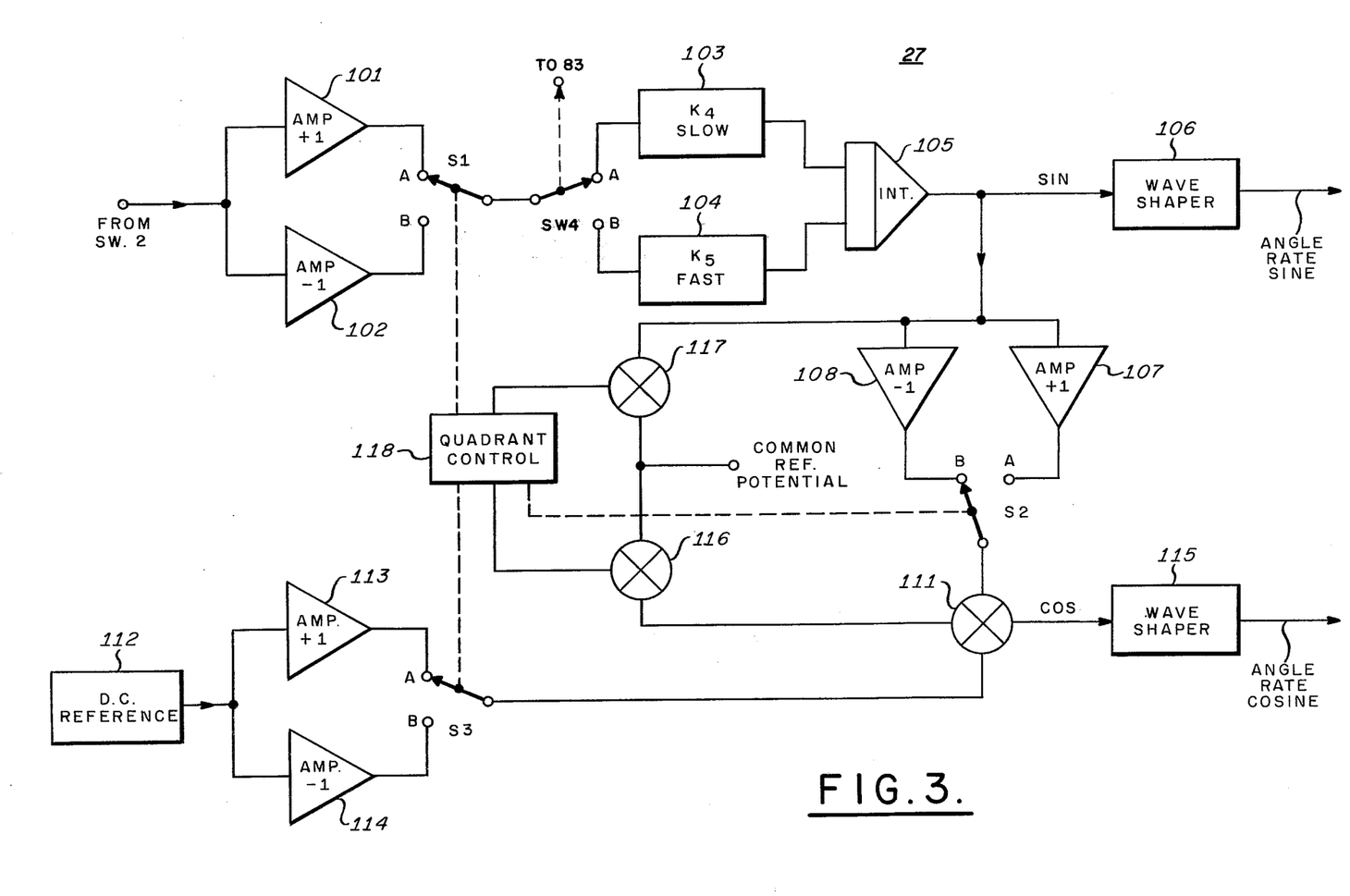
FIG. 3 is a block diagram illustrating the components of the angle rate generator apparatus of the present invention.

FIG. 3 depicts the angle rate generator 27 of the present invention. The signal on the wiper of the switch SW2 is coupled through amplifiers 101 and 102 having gains of +1 and −1 respectively. The output from either amplifier 101 or 102, depending on the status of switch S1, is coupled to the wiper of switch SW4. The contacts of SW4 are coupled to fast-slow amplifiers 103 or 104, each having an output coupled to integrator 105. The output of integrator 105 is coupled to a wave shaper 106 and to amplifiers 107 and 108 also having gains of +1 and −1 respectively. The output of either amplifier 107 or 108, depending on the status of switch S2, is coupled to summing junction 111.

A d.c. reference signal is developed in d.c. reference circuit 112 and coupled to amplifiers 113 and 114 having gains of +1 and −1 respectively. The output of either amplifier 113 or 114 is coupled to summing junction 111 depending on the status of switch S3. The output of summing junction 111 is coupled to a wave shaper 115 and to a summing junction 116. Summing junction 117 is coupled to the output of integrator 105. Summing junctions 116 and 117 are both coupled to a common reference potential and a quadrant control circuit 118. The quadrant control circuit 118 monitors the polarity of the sine and cosine signals as represented by the output of the integrator 105 and summing junction 111 respectively and actuates switches S1, S2 and S3 according to the truth table of FIG. 4.

Figure 5:
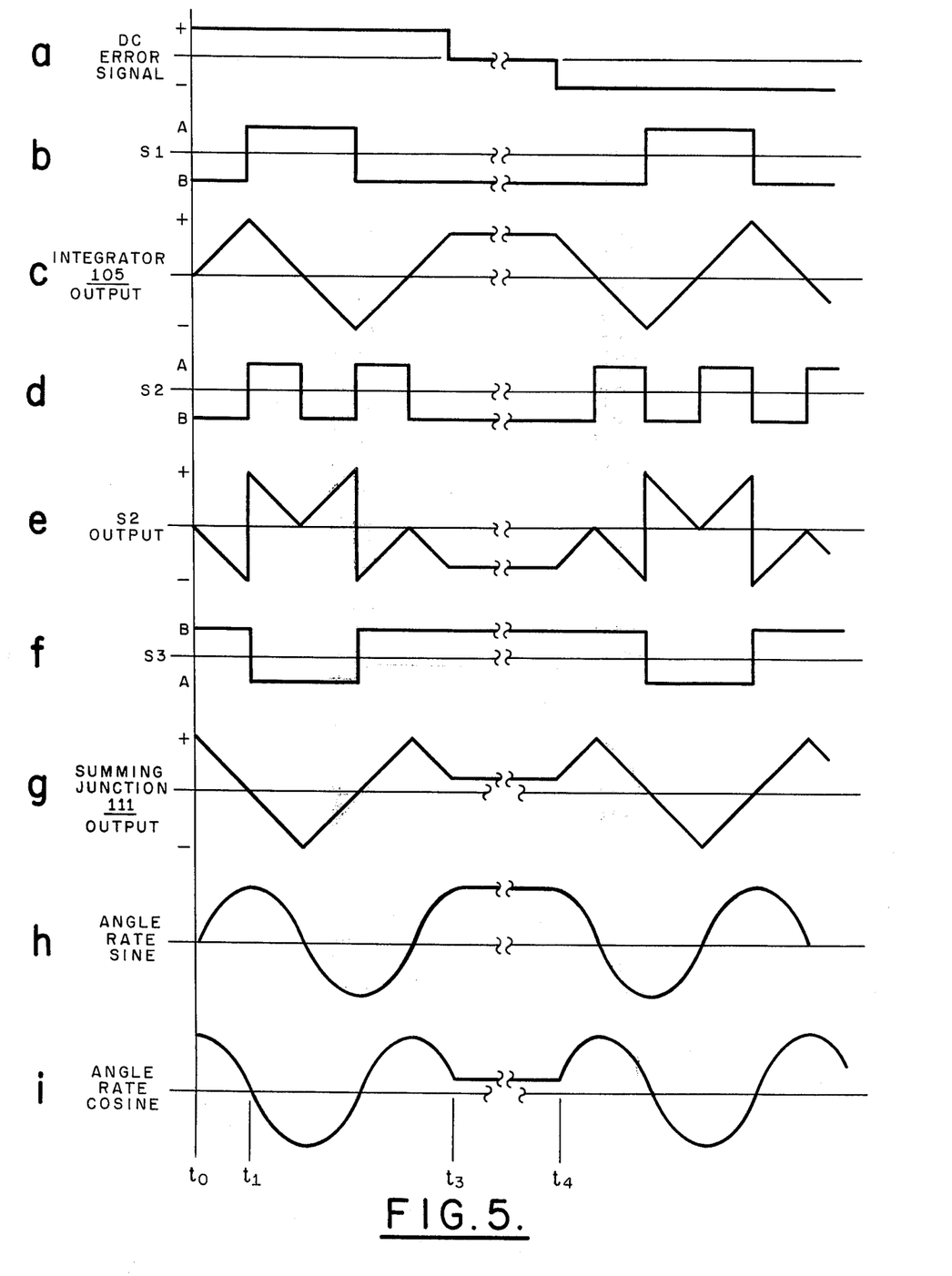
FIG. 5 is a series of waveforms illustrating the operations of the various components of the angle rate generator apparatus.

The operation of the angle rate generator may be most easily described in conjunction with the graphic diagrams of FIG. 5. Assume initially, a positive d.c. error signal having constant amplitude is coupled to the inputs of amplifiers 101 and 102. Switches S1, S2, S3 and SW4 are all in the positions indicated in FIG. 3. Accordingly, the d.c. error signal is amplified by amplifier 101 and applied through amplifier 103 to the integrator 105. The integrator 105 is a conventional dual slope integrator in which the slope and the direction are determined by the magnitude and polarity respectively of the d.c. input supplied signal thereto. The output of the integrator 105, illustrated in FIG. 5c, initially at time $t_0$, begins to rise at a constant rate and continues to do so until time $t_1$. At the same time, the output from switch S2, illustrated in FIG. 5e, similarly begins to descend as a result of the status of switch S2. The d.c. reference signal, which in this example is negatively polarized, is inverted to a positive polarity as a result of the status of switch S3 as indicated in FIG. 5f and summed with the output from switch S2 to provide the cosine signal as illustrated in FIG. 5g. It can be appreciated from FIGS. 5c and 5g that the appropriate 90° phase shift between the sine and cosine components of the angle rate signal has been established.

Figure 4:
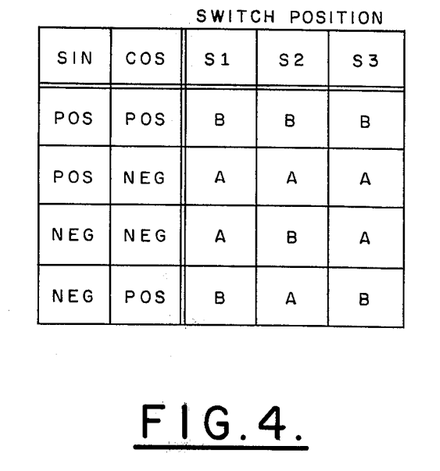
FIG. 4 is a truth table of the logic circuitry within the quadrant control circuit of the angle rate generator apparatus.

At time $t_1$, the quadrant control circuit 118 which monitors the polarity of the sine and cosine components of the angle rate signal detects a polarity reversal in the cosine signal, as illustrated in FIG. 5g. The quadrant control circuit 118 comprises conventional crossover detector circuits for monitoring the polarity of the sine and cosine component signals as well as suitable logic circuitry to actuate switches S1, S2 and S3 according to the truth table of FIG. 4. The polarity reversal in the cosine signal at time $t_1$ detected by quadrant control circuit 118 results in the actuation of switches S1, S2 and S3 as indicated in FIG. 4. The development of the sine and and cosine components of the angle rate signal continue on as indicated in FIGS. 5a through 5g until time $t_3$ is reached.

At time $t_3$, the d.c. error signal $\psi_{err}$ reduces to zero potential. At this point, and until the d.c. error signal $\psi_{err}$ resumes a finite value, the sine and cosine signals as illustrated in FIGS. 5c and 5g will each maintain a constant magnitude equal to the respective levels of each at time $t_3$. For the purposes of illustration, the d.c. error signal $\psi_{err}$ has been represented as a signal having a constant magnitude with a step waveform drop to zero potential at time $t_3$. It should be noted, however, that typically the d.c. error signal $\psi_{err}$ will not abruptly change to zero potential, as indicated in the step waveform of FIG. 5a but rather will gradually decrease as it approaches the zero potential value due to the electronic slaving performed by the system. Furthermore, since the slope of the output from the integrator 105, i.e., the sine component, is dependent on the magnitude and polarity of $\psi_{err}$ and since the magnitudes of the sine and cosine components are maintained at a constant amplitude, the frequency of the sine and cosine components will similarly gradually decrease as the respective periods thereof increase.

It can be appreciated that during this time interval (subsequent to $t_3$) that the magnitudes of the sine and cosine components of the angle rate signal, as depicted in FIGS. 5c and 5g, respectively, may be represented by the relations $x$(DE REF) and $y$(DC REF) respectively where DC REF equals the magnitude of the d.c. reference signal and $(x^2 + y^2) = 1$. The sine and cosine component signals therefore represent a single specific angle $\theta$ during this time period ($t_3$ to $t_4$) where $\tan \theta = x/y$. Accordingly, the angle $\theta$, which represents the difference between a long term component of the directional heading and a long term component of the magnetic heading will be coupled to the sine/cosine windings of rotor 45, via modulator circuits 41 and 42 and the stator sine/cosine windings 43.

At time $t_4$, the d.c. error signal $\psi_{err}$ once again resumes a finite value and the sine and cosine signals as depicted in FIGS. 5c and 5g appropriately respond. It should be noted, however, that the cosine signal as depicted in FIG. 5g has undergone a 180° phase reversal due to the fact that the d.c. error signal $\psi_{err}$ is oppositely polarized with respect to the time period preceding $t_3$.

Figure 6:
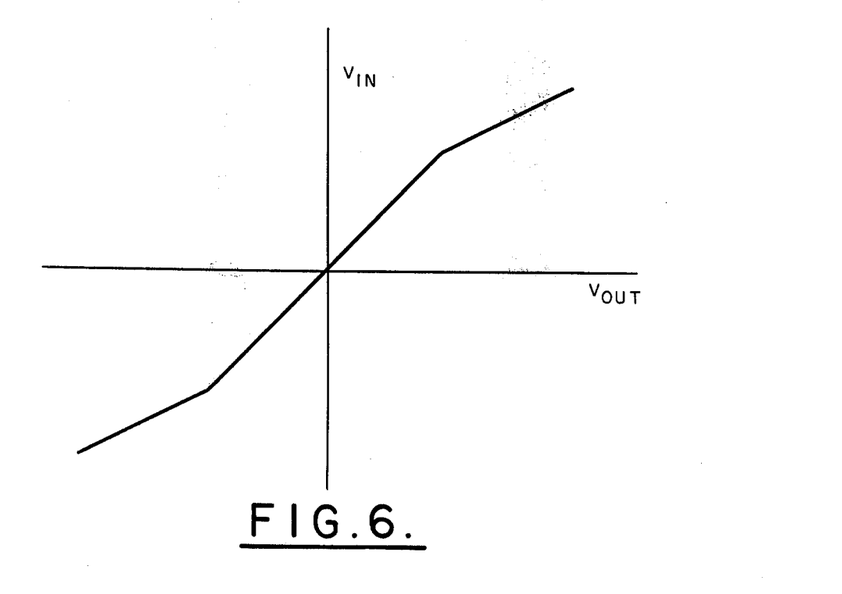
FIG. 6 is a waveform diagram illustrating the transfer function of the wave shaping circuits of the angle rate generator apparatus.

The sine and cosine components generated at the outputs of the integrator 105 and the summing junction 111 respectively have triangular waveforms. For this reason, these signals are coupled to wave shaping circuits 106 and 115 respectively prior to application to modulator circuits 41 and 42 to convert the triangular waveforms to sinusoidal waveforms. Wave shaping circuits 106 and 115 may comprise any conventional wave shaping circuit, preferably including operational amplifiers having diode network feedback circuits, and having the transfer characteristic of FIG. 6. The outputs of wave shaper circuits 106 and 115 are depicted in FIGS. 5h and 5i respectively.

It should be noted that quadrant control circuit 118 may utilize a peak detector in place of a cross-over detector for actuating switches S1, S2 and S3. Specifically, the quadrant control logic may compare the absolute amplitudes of the sine and cosine signals at the outputs of the integrator 105 and the summing junction 111 respectively with the amplitude of the d.c. reference signal. Additionally, the quadrant control circuit 118, similar to that described in the previous example, would include circuitry to monitor the polarity of the sine and cosine signals as well as logic circuitry responsive thereto for actuating switches S1, S2 and S3 according to the truth table of FIG. 3.

Switch SW4 and amplifiers 103 and 104 are utilized principally during the fast slaving or synchronization mode previously discussed. Specifically, switch SW4 is normally disposed in the A position as indicated in FIG. 3. In this position, amplifier 103 scales the d.c. error signal $\psi_{err}$ at a normal or low rate with respect to the fast slaving mode. During a fast slaving mode, however, switch SW4 is actuated by the switch control logic 83 thereby coupling the fast slaving signal from amplifier 74 to amplifier 104. Amplifier 104 has a high gain with respect to amplifier 103 and is utilized to scale the fast slaving signal from amplifier 74 at a fast slaving (1250 degrees per minute) rate. As previously discussed, once the magnitude of the d.c. error signal $\psi_{err}$ decreases below the predetermined value of level detector 81, switch SW4 will be reactuated to the A position.

While the invention has been described in its preferred embodiments, it is to be understood that the words which have been used are words of description rather than of limitation and that changes within the purview of the appended claims may be made without departing from the true scope and spirit of the invention in its broader aspects.

We claim:

1. In a gyromagnetic compass system for a navigable craft, angle rate generator apparatus responsive to a d.c. error signal for producing therefrom an angular rate signal proportional thereto having sine and cosine component signals and useful for electronically slaving and compensating the inertial directional reference of said compass system wherein said angle rate generator apparatus comprises:
    integrator means for integrating said d.c. error signal and generating at the output thereof said sine component signal having a frequency and phase which vary as a function of the amplitude and polarity respectively of said d.c. error signal and wherein said sine component signal in response to a d.c. error signal of zero amplitude maintains a constant amplitude;
    first polarity control means for alternating the polarity of the d.c. error signal coupled to said integrator means;
    second polarity control means coupled to the output of said integrator means for varying the polarity of the slope of said sine component signal;
    amplitude reference source means for producing a d.c. reference signal having a fixed amplitude;
    third polarity control means for alternating the polarity of said reference signal;
    summing means for summing said reference signal and said sine component signal as varied by said second polarity control means and producing therefrom said cosine component signal; and
    quadrant control means responsive to said sine and cosine component signals for actuating said first, second and third polarity control means such that a sine/cosine relationship is maintained between the amplitudes of said sine and cosine component signals.

2. The apparatus as set forth in claim 1 wherein said first, second and third polarity control means each comprise:
    first and second amplifier means each having an input coupled to the signal whose polarity is being alternated and an output and wherein the gain characteristics of said first and second amplifiers are equal to unity in amplitude and opposite in polarity; and
    switching means responsive to said quadrant control means for switching between the outputs of said first and second amplifier means.

3. The apparatus as set forth in claim 1 wherein said quadrant control means comprises:
    sensing means for detecting a change in polarity in said sine and cosine signal components; and
    logic means coupled to said first, second and third polarity control means and responsive to said sensing means such that said first, second and third polarity control means are actuated each time said cosine signal component changes polarity and said second polarity control means is additionally actuated each time said sine component signal changes polarity.

4. The apparatus as set forth in claim 1 wherein said quadrant control means comprises:
    sensing means for comparing the absolute amplitudes of said sine and cosine component signals with the amplitude of said reference signal; and
    logic means coupled to said first, second and third polarity control means and responsive to said sensing means such that said first, second and third polarity control means are actuated each time the absolute value of said sine component signal reaches the amplitude of said reference signal and said second polarity control means is additionally actuated each time the absolute amplitude of said cosine component signal reaches the amplitude of said reference signal.

5. The apparatus as set forth in claim 1 further including first and second wave shaping means coupled to said integrator means and said summing means respectively for shaping said sine and cosine component signals respectively into substantially sinusoidal wave forms.

6. In a gyromagnetic compass system for navigable craft operable in a plurality of modes of operation including a magnetic compass for providing a signal proportional to the magnetic heading of the craft, a directional gyroscope for providing a signal proportional to the inertial heading of the craft, differential means having one input connected with said gyroscope and another input coupled to said magnetic compass for producing a differential output signal, and system output means normally responsive to said differential output signal for producing a system output signal and adapted for connection to craft heading utilization apparatus, an improved signal processor for said system comprising:
    comparator means responsive in one of said modes of operation to said magnetic compass signal and said system output signal for providing a d.c. error signal having a sense and amplitude proportional to any difference between the magnetic and inertial headings of the craft,
    electronic analog angle rate generator means responsive to said d.c. error signal including a variable time constant integrator for providing a pair of constant amplitude a.c. signals having a sine and cosine relationship and having frequencies dependent upon a predetermined rate at which said error signal is to be reduced towards zero, said predetermined rate corresponding to the time constant of said integrator means,
    means for supplying in said one mode of operation said a.c. signals to said other input of said differential means, and
    means for supplying said differential output signal to said system output means whereby to reduce said d.c. error signal toward zero at a rate determined by the frequency of said a.c. signals.

7. The signal processor as set forth in claim 6 further including:

switch means for supplying in one position thereof said d.c. error signal to said angle rate generator means and for selecting a first time constant for said integrator means to thereby produce a frequency of said a.c. signals such that said error signal is reduced at a rate on the order of one to five degrees per minute, means for supplying a d.c. signal of a predetermined fixed amplitude to said switch means, and said switch means supplying in another position thereof said fixed amplitude d.c. signal to said angle rate generator and selecting a second time constant for said integrator means and thereby produce a frequency of said a.c. signals such that said error signal is reduced towards zero at a rate on the order of one thousand degrees per minute.

8. The signal processor as set forth in claim 7 further including:

level detector means responsive to said d.c. error signal for automatically operating said switch means from said one position to said other position upon said error signal exceeding a predetermined amplitude.

9. The signal processor as set forth in claim 6 further including:

switch means operable in another of said operating modes for bypassing said differential means and coupling said a.c. signals directly to said system output means whereby said comparator means provide a d.c. error signal having a sense and amplitude proportional to any difference between the instantaneous magnetic heading of the craft and the output of said angle rate generator means.

10. The signal processor as set forth in claim 6 further including:

means for providing a d.c. signal having an amplitude proportional to the normal drift rate of said directional gyroscope and the operating latitude of said craft, and switch means operable in a further of said operating modes for disconnecting said d.c. error signal from said angle rate generator means and substituting therefor said d.c. signal having an amplitude proportional to the normal drift rate of said directional gyroscope and the operating latitude of said craft.

11. The signal processor as set forth in claim 6 wherein said comparator means includes:

means responsive to said magnetic compass signal for providing a pair of a.c. signals proportioned respectively to the sine and cosine components of said magnetic heading, first means for converting said pair of a.c. signals to a single signal having a constant amplitude and a phase proportional to said magnetic heading, second means for converting said output signal of said system output means to a single signal having a constant amplitude and a phase proportional thereto, and demodulator means responsive to each of said single signals for providing said d.c. error signal.

12. The signal processor as set forth in claim 7 further including limiter means responsive to said d.c. error signal for limiting the maximum amplitude thereof to an amplitude compatible to the first time constant of said integrator means to produce said frequency of said a.c. signals corresponding to a reduction rate of said error signal to said order of one to five degrees per minute.

* * * * *